Patented Nov. 28, 1944

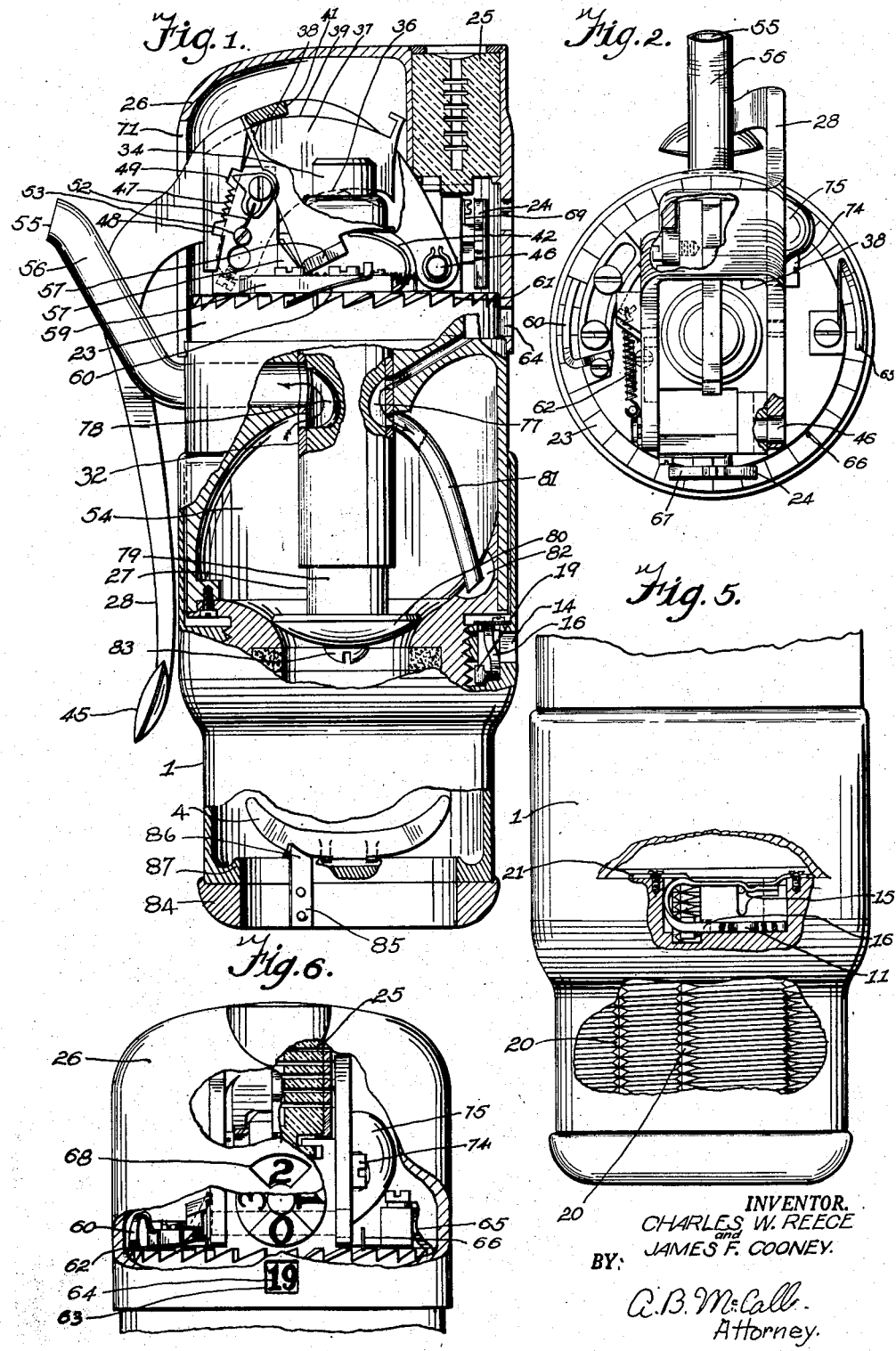

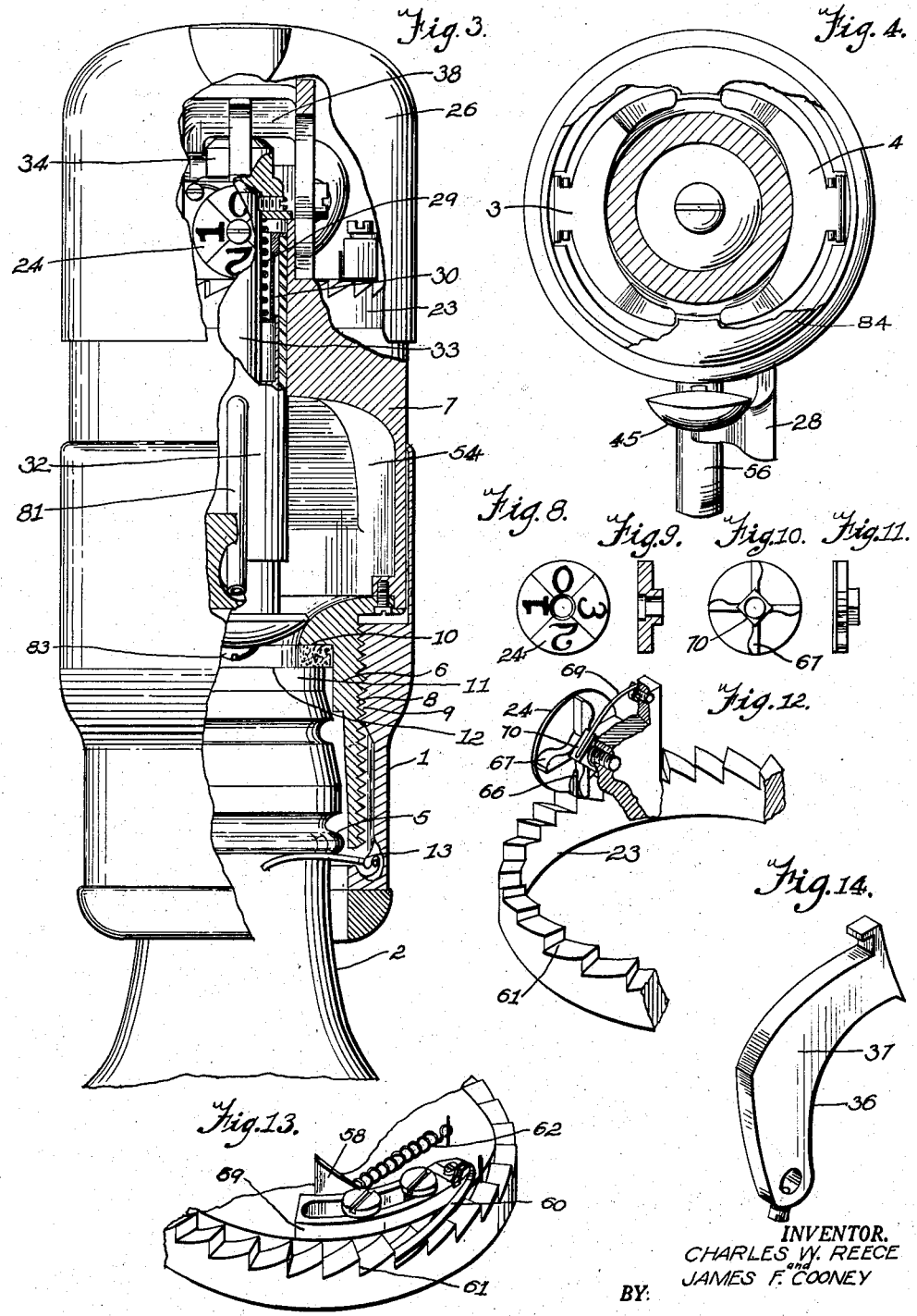

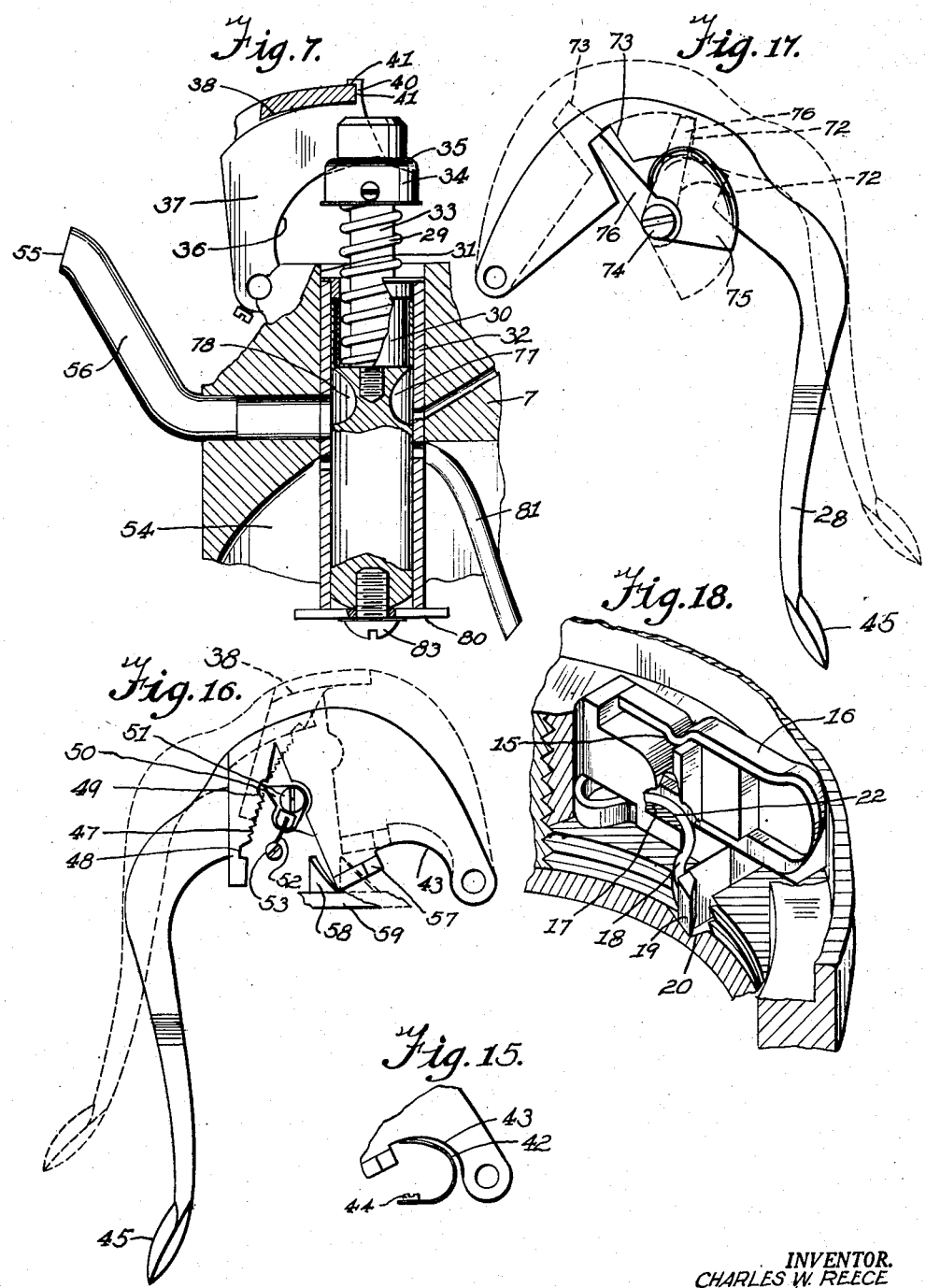

2,363,747

UNITED STATES PATENT OFFICE 2,363,747

LEVER LOCK FOR DISPENSING DEVICES

Charles W. Reece, Bartonville, and James F. Cooney, Springfield, Ill., assignors of fifty per cent to said Reece, forty per cent to said Cooney, five per cent to George E. Boettcher, Springfield, Ill., and five per cent to Eva G. Reeder, Springfield, Ill.

Application January 12, 1942, Serial No. 426,526

1 Claim. (Cl. 222—153)

Our invention relates to dispensers; and especially to dispensers of fluids such as may require the dispensing done in predetermined accurately measured quantities with each measured quantity that is dispensed to be registered in a manner that will record each of the dispensed measurements as well as record a summarized total of all fluid measurements that have been dispensed from a container.

Another purpose of our invention is to provide a fluid measuring and registering dispenser of such construction as will permit it to be lockably and communicatively connected with a fluid container and will permit the fluid measuring and registering mechanism of the dispenser to be locked against pilfering.

A particular purpose of our invention is to provide a fluid measuring and registering dispenser constructed to permit its lockable communicative connection with a bottle; will permit the dispensing mechanical elements of the unit to be locked against pilfering and an operative construction that will make it necessary for such a bottle provided with one of our dispensers, to be tilted to a predetermined fluid dispensing angle before a dispensing lever thereof may be adjusted to a position where it can affect a release of such fluids from the bottle.

We attain the objects of our invention by the fluid dispensing unit described in this specification, recited in the claim and illustrated in the accompanying drawings.

Referring to the drawings:

Fig. 1 is a side elevation showing in a cutaway certain operative details of construction of our fluid measuring and registering dispenser.

Fig. 2 is a top view of our invention with the cover portion of the casing removed.

Fig. 3 is a rear elevation of our dispenser shown secured to a bottle.

Fig. 4 is a bottom view of our dispenser.

Fig. 5 is a detail face view illustrating the lock means for preventing the dispensers removal from a bottle neck.

Fig. 6 is a detail face view of the mechanism for registering the several measured quantities of fluid released by our dispenser.

Fig. 7 is a vertical section and cutaway illustrating the valve construction of our dispenser together with the valve retracting spring and cam seat cap for the valve.

Fig. 8 is a front view of the registering dial.

Fig. 9 is a cross section of the same.

Fig. 10 is a rear view of the same.

Fig. 11 is a side view of the dial.

Fig. 12 is a perspective showing the operative fitting relation of the register dial, the ratchet ring which controls the dial movements and the dial moving pin and dial control teeth moved by the pin when adjusting the dial.

Fig. 13 is a perspective of a spring pawl and sliding cam block adapted to effect a step by step motion of the ratchet ring as the dispensing handle is adjusted for the release of fluids.

Fig. 14 is a perspective of the valve control cam which is slidably and pivotally actuated by the dispensing lever.

Fig. 15 is a retracting spring for the dispensing lever.

Fig. 16 is a one side view of the dispensing lever.

Fig. 17 is the other side view of the dispensing lever.

Fig. 18 is a detail of the operative construction of the lock shown in Figure 5 and adapted to hold the dispenser casing in operative position on a bottle neck containing fluids.

We are aware of the existence of more than one fluid dispensing unit; but it is our purpose to provide in the novel operative construction of our invention, broadly speaking, a fluid measuring and registering dispenser which may be lockably and communicatively secured to a fluid container either directly connected therewith or by a remote connection therewith in a manner that will permit the invention to function efficiently as it measures and registers predetermined quantities of fluids as they are being dispensed; while at the same time we propose to provide in such a fluid dispenser an effective means of locking the same against pilfering.

Thus when merchandising fluids such as expensive medicines, chemicals and drinks of both alcoholic and non-alcoholic content or other valuable fluids needing the service and efficiency of both a measuring and registering dispenser then it will be essential to the welfare of the business to provide some means incorporating in its construction some way to lock it against pilfering as well as some way to accurately measure and register each and every quantity of predetermined size of fluid that is dispensed from a container; so that a merchant may be able to know accurately from time to time whether or not he is receiving the correct amount of money for all fluids that are being dispensed by or through his merchandising establishments.

In our efforts to achieve this most practical and much needed efficient service in this field we have devised a fluid dispenser which not only is capable of an operative attachment to fluid containers of different types by a direct connection; but which may be attached by a remote connection if desired.

However in this specification we are disclosing, illustrating and describing our dispensing unit as it will be analyzed in connection with its operative lockable and communicative attachment to a fluid bottle with its novel details of construction and mechanism functions which will not only accurately measure predetermined quantities of bottled fluids as they are being dispensed but will also record and register each quantity dispensed and indicate with it a total summary of all of such quantities dispensed, with a visible showing of such records at all times.

Thus in a detailed analysis of the salient features of novelty in our dispensing unit we shall now describe the same with reference to its construction as illustrated in the drawings; wherein a dispenser collar 1 is slipped over a bottle neck 2 permitting pivoted yoke members 3 and 4 within the base of collar 1 to drop over engaging the bottle neck under annular rib 5 thereof to prevent undesired removal of collar 1 from the bottle neck.

When mounting our dispenser on a bottle so that it may not be removed unintentionally we then insert the lower sleeve portion 6 of the dispensing casing 7 down into the lower collar 1 permitting threads 8 of sleeve 6 to threadably engage threads 9 of collar 1 to hold them firmly together.

When securing sleeve 6 into collar 1 of casing 7 we thus forcefully draw annular shoulder 10 of casing 7 down upon the top 11 of bottle mouth 12, and at the same time rotatably urges upwardly on members 3 and 4 pivoted on bottom terminal hooks 13 of collar 1.

When casing 7 is firmly screwed into collar 1 by its lower threaded sleeve portion 6 it will be then locked into its tight engagement with bottle neck 2 by means of a spring lock operatively housed within the wall of collar 1 just out-side of threads 9 thereof.

This lock is operated with a key (not shown), but adapted to be inserted in a key hole 14 for lifting a deformation 15 of lug spring 16 permitting the slidable key adjustment of cam plate 17 and slidably engages a curved spring 18 having a terminal stop member lug 19 which resiliently springs into vertical notch 20 extending through threads 8 of sleeve 6 in order to prevent sleeve 6 from being threadably turned in threads 9 of collar 1 when it is not desired. In the construction of this lock the holding portion 15 defined in lock member 16 is held down by an anchoring plate 21. Thus the sliding cam plate 17 is slidably moved against the curve 22 of cam spring 18 with releasing stop member lug 19 from groove 20 extending across threads 8 in the sleeve 6 when unlocking the dispenser casing from its firmly screwed engagement with a bottle neck 2.

After thus securing casing 7 to collar 1 by threadably screwing sleeve 6 thereto and after adjusting the ratchet ring 23 and its cooperating fluid registering dial 24 covering, the dispensing mechanism of casing 7 will be locked in place by turning lock 25 with a key.

It will be obvious that it would be possible to devise a number of ways to measure and dispense predetermined or selected quantities of fluids from containers thereof; but in a study of our invention it should be borne in mind that it is our purpose to provide in this device not only a means quickly and accurately measuring the fluids in such desired quantities as they are needed, but we accurately record each quantity that is dispensed and very effectively lock the dispensing unit against pilfering.

For instance we use a plunger type reciprocating valve 27 actuated by dispensing lever 28 which is carefully controlled in its movements by means adapted to prevent any adjustment thereof for the release of fluids until the bottle with the dispenser is tipped to a predetermined dispensing angle.

We thus achieve our purpose by our novel control of valve 27 with dispensing lever 28.

Valve 27 is normally lifted up off of shoulder 10 over the bottle mouth 11 by a retracting spring 29 resting in a spring seat cap 30 extending down into the top terminal chamber 31 of valve 27 which slidably moves in sleeve 32 fixed centrally in casing 7. This spring 29 encompasses an upright threaded shank 33 at the top of valve 27 while a cam seat cap 34 threadably engages shank 33 of valve 27 and is provided with a curved cam seat channel 35 for the slidable contact of the bottom cam edge 36 of cam member 37 which in turn is actuated by dispensing lever 28 having an integral curved cam pressure portion 38 which slidably presses down upon the curved cam edge 39 defined as the top surface of cam 37.

This cam 37 also has an integral stop member hook 40 normally engaging a top integral edge 41 of dispensing lever 28 for limiting the released movement or upward lift of dispensing lever 28 which is lifted by a metallic spring 42 engaging dispensing lever 28 near point 43 where it is pivotally supported. This spring 42 is held in place by a screw 44.

It will be noted that dispensing lever 28 is shaped at its free end to define a hand grip 45, at its pivoted end to define a yoke terminal anchored to a supporting pin 46, and intermediate its ends a top portion defining an inverted channel, the opposed sides of which have independent functions to perform.

For instance cam pressure portion 38 of dispensing lever 28 slidably rides at top curved surface 39, while one lower edge of the inverted channel portion of dispensing lever 28 is shaped to define a tooth segment 47 having recessed terminals 48 and 49 at its ends which are utilized in conjunction with a pawl 50 carried by a screw 51 and resiliently held in place by a spring member 52 supported on a pin 53 and adapted to prevent dispensing lever 28 from being adjusted to a dispensing position until the dispensing unit is tilted to a predetermined angle where it will completely and quickly drain all fluid from the measuring chamber 54 as it flows out the mouth 55 of dispensing tube 56 into a receptacle. In this way tooth segment 47 of dispensing lever 28 will contact pawl 50 preventing an adjustment of the lever until the dispenser is tilted properly, in which position pawl 50 would then register in recess 48.

On the same side of the inverted formation of dispensing lever 28 we are providing an integral pusher lug 57 adapted to slidably engage cam segment 58 of a sliding cam block 59 carrying a spring pawl 60 adapted to successively drop into notches 61 of ratchet ring 23 permitting spring pawl 60 thus to rotatably move ratchet ring 23 step by step one ratchet tooth at a time for each dispensing adjustment of dispensing lever 28; it will be observed here that tensile spring 62 secured to sliding cam block 59 has the function of automatically returning cam block 59 with its attached spring pawl 60 each time after spring pawl has pushed the ratchet ring another step or another notch during a dispensing operation.

Thus in this way each time the fluid chamber 54 is emptied then the quantity of fluid it holds will be accurately shown through window 63 in dispenser cap 26 where the number 64 of each succeeding ratchet tooth of ring 23 may be seen as it indicates exactly how many times chamber 54 has been filled and emptied.

It will be noted in Figure 12 that each successively dispensed adjustment of lever 28 thus to rotatably move ratchet ring 23 one step further around in its rotation where it is held by a holding spring 65 which snaps down into the ratchet teeth at its terminal while a pin 66 extending above ratchet teeth 61 of ring 23 contacts one of the radially disposed teeth 67 of dial 24 moving the same a quarter turn bringing another numeral in registry with window 68 of cap 26 to indicate an additional complete rotation of ratchet ring 23.

For example if a number 2 shows in window 68 and a number 19 shows in window 63 this would indicate that ratchet ring 23 has been completely turned twice one step at a time and each chamber full dispensed and is now on the 19th registering ratchet tooth and indicating that ratchet ring 23 is on its 19th dispensing operation toward the third complete rotation of this ring.

It will be observed that when pin 66 moves dial 24 a quarter turn by its contact with teeth 67 there would be a tendency sometimes to push the dial too far; and to prevent this we are providing a spring 69 resiliently pressing upon a square hub 70 of dial 24, so that spring 69 will hold dial 24 in place each time after it is rotated a quarter turn.

Cap 26 has a slot 71 through which dispensing lever 28 extends.

On that edge of dispensing lever 28, which is opposite the cam pushing lug 57 of this lever we are providing a stepped notch construction having a shallow notch 72 and a deeper notch 73. Cooperating with notches 72 and 73 of dispensing lever 28 we are providing a weighted pawl pivoted on a supporting pin 74 with a weighted lug 75 on one side of pin 74 and a stop member tooth 76 on the other; so that when lifting spring 42 raises dispensing lever 28 after it is released then tooth 76 will register in the shallow notch 72, in which position tooth 76 will hold dispensing lever 28 against any possible adjustment from pressing on the free end 45 thereof; but when the bottle and dispensing unit have been tilted to the desired angle for dispensing fluids from chamber 54 then the counterbalance or weighted lug 75 carried by pin 74 will at once swing tooth 76 back to a position where the deeper notch 73 will slip down over the end of tooth 76, permitting dispensing lever 28 to be pressed by hand at its free end 45 up to a position where it will release the fluids from chamber 54.

In a functional study of valve 27 and its operative relation to the dispensing lever 28 which controls the same, it will be noted that this valve has at its top end the valve seat cap 34 with a curved valve seat 35 with cam 37 slidably pressing upon the same when dispensing lever 28 presses down upon cam 37 in order to move valve 27 downwardly against the resistance of a retracting spring 29 seated in spring seat cap 30.

This valve 27 is normally lifted to a position where it will admit fluid to chamber 54 to fill the same and when in this position the two opposed side wall recesses or notches 77 and 78 respectively are lifted with valve 27 by spring 29 to an elevation where the solid cylindrical wall 79 of valve 27 will positively close the passages for air and fluid which are needed for the release of fluid from chamber 54.

However when it is desired to dispense a predetermined quantity of fluid such as would fill chamber 54, the bottle is first tilted enough to permit the fluid to run into and fill chamber 54; then valve 27 is pushed down to a position where the valve gasket 80 will rest upon shoulder 10 shutting off any more fluids from the bottle; while at the same time this adjustment of valve 27 places side wall recess or notch 77 of valve 27 in communicative registry where intake tube 81 which terminates in a chamber wall pocket 82 preventing undesired escape of fluids through the air tube 81, and this adjustment of valve 27 also moves recess or pocket 78 down to a position of communicating registry with the intake end of the fluid outlet tube 56.

Thus when valve 27 is forced down by dispensing lever 28 where its side wall recess 77 provides an air communication through air tube 81 into chamber 54 then the fluid filling chamber 54 will readily escape from this chamber out through the valve wall recess 78 and the fluid discharge tube 56 as the valve gasket 80 holds back the fluid in the bottle.

It will be noted that gasket 80 of valve 27 is held in place by a screw 83.

It will be observed in Figure 1 that a bottom ring 84 carried by collar 1, has an opposed pair of supporting straps 85 each shaped at its top end 86 to hook over the annular hook portion 87 at the base of collar 1; and this pair of opposed straps 85 are shaped at their top ends 86 also to define an effective cam shaped terminal with which the opposed yoke members 3 and 4 may be lifted for the removal of collar 1 from a bottle neck merely by rotating ring 84 far enough to rotatably slip the cam terminal 86 in under yoke members 3 and 4 which are pivotally hinged in operative position within the inner wall at the base of collar 1.

It will be obvious that it will be desirable to manufacture our dispensing unit from materials that are light weight and practical for the service for which they are intended with a dispenser unit that is capable of functioning in an efficient manner when made up as an attractive operating unit for service in public places.

Having thus described the nature of our invention what we claim is:

In a fluid dispenser for fluid bottles, a casing removably securable to the bottle neck, a dispensing lever pivoted within said casing with the lever's free end flanking the outer side thereof, a weighted pivoted tooth-type lug beneath said lever and stepped notches in the lever for receiving said lug and adapted to automatically prevent said lever from becoming adjusted to a fluid dispensing position until the casing and lever are tilted to a dispensing angle.

CHARLES W. REECE.
JAMES F. COONEY.